United States Patent
Grove et al.

[11] Patent Number: 5,074,578
[45] Date of Patent: Dec. 24, 1991

[54] WHEEL CAMBER AND BRAKE CALIPER ADJUSTMENT SHIM

[76] Inventors: Clinton E. Grove, R.R. 2; Robert D. Grove, 317 Seventh Ave. SE., both of Elbow Lake, Minn. 56531

[21] Appl. No.: 598,543

[22] Filed: Oct. 16, 1990

[51] Int. Cl.$^5$ .............................................. B62D 17/00
[52] U.S. Cl. .................................. 280/661; 384/626; D8/354
[58] Field of Search .................. 280/661; 384/626; D8/354

[56] References Cited

U.S. PATENT DOCUMENTS

| | | | |
|---|---|---|---|
| D. 272,392 | 1/1984 | Bigelow | 280/661 |
| D. 275,551 | 9/1984 | Bigelow | 280/661 |
| 774,042 | 11/1904 | Cooper | 280/661 |
| 4,037,680 | 7/1977 | Grove | 280/661 |
| 4,195,862 | 4/1980 | Specktor et al. | 280/661 |
| 4,684,150 | 8/1987 | Specktor et al. | 280/661 |
| 4,872,699 | 10/1989 | Grove et al. | 280/661 |

*Primary Examiner*—Kenneth R. Rice
*Attorney, Agent, or Firm*—Dorsey & Whitney

[57] ABSTRACT

A shim is used to adjust camber in a wheel mounted on a suspension assembly that has a mounting plate with an opening for a drive axle for mounting both a brake caliper and a hub and wheel bearing assembly associated with the wheel. The shim has a central shim body tapered to define a shim angle. The shim body has a drive axle opening therethrough and a plurality of openings for fasteners connecting the hub and wheel bearing assembly to the mounting plate. At least one brake caliper lobe extends from the central shim body and provides an extension of the central shim body defining the same shim angle as the shim body. The lobe further has an opening therethrough for a fastener connecting the brake caliper to the mounting plate. The shim is interposed between the mounting plate, on the one hand, and the disk brake caliper and hub and wheel bearing assembly, on the other hand, to adjust the angle of both by the defined shim angle.

8 Claims, 2 Drawing Sheets

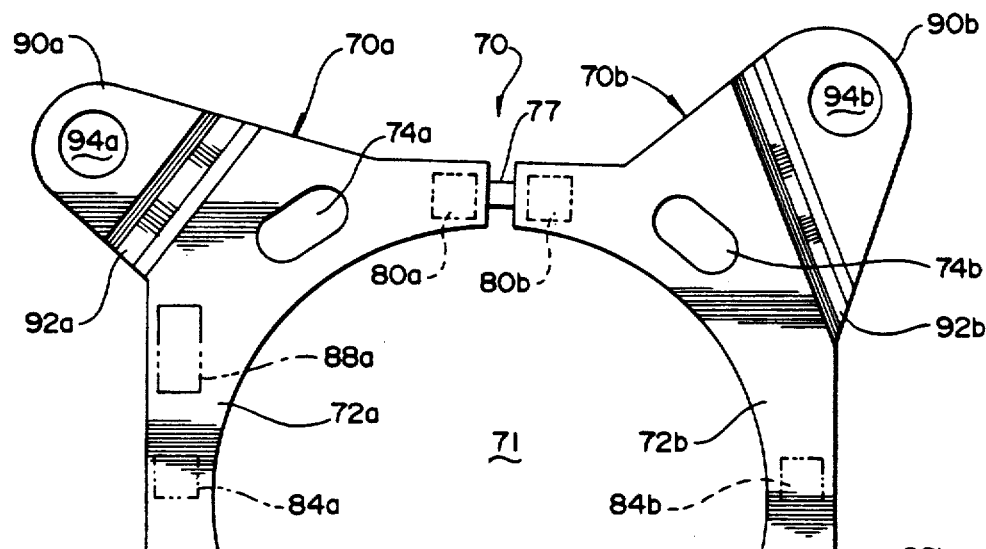
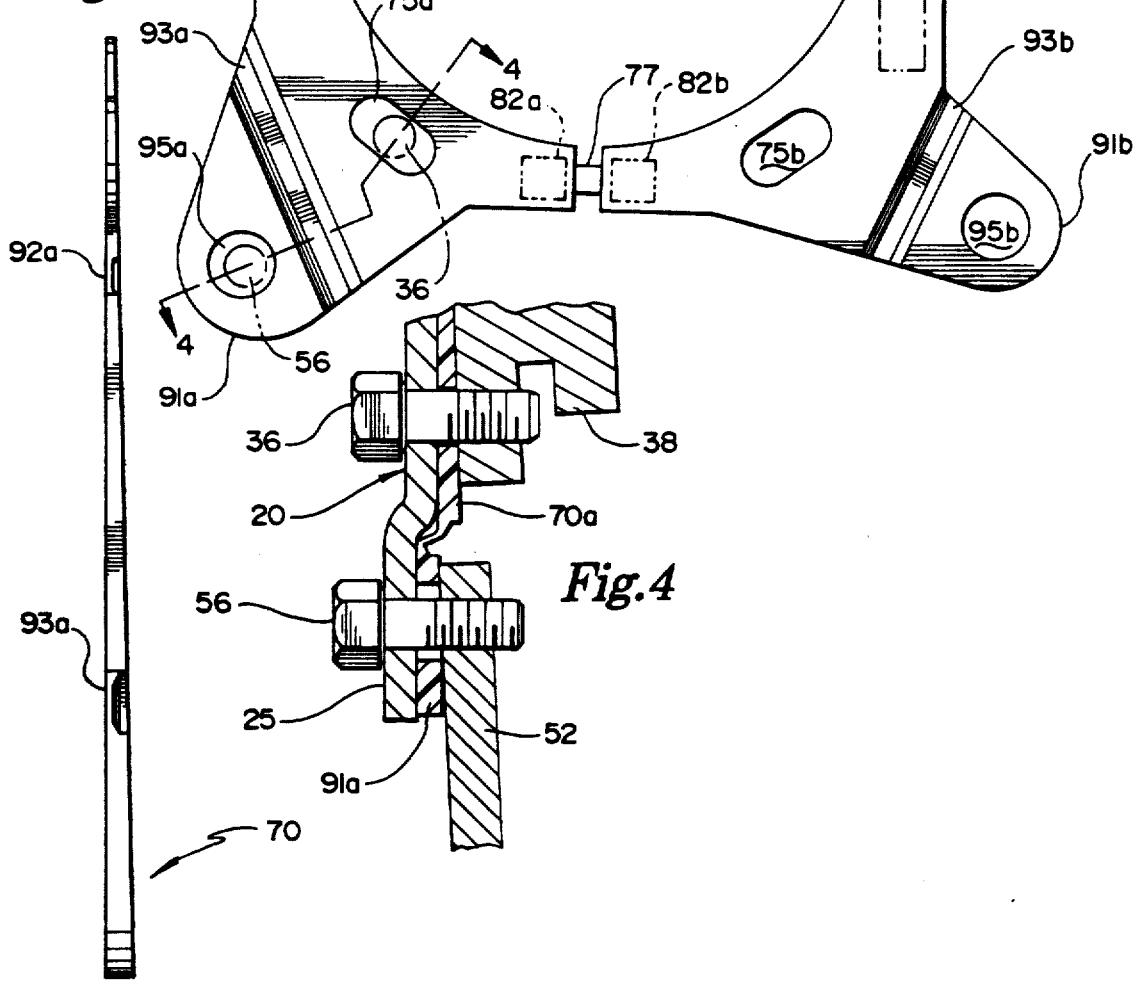

WHEEL CAMBER AND BRAKE CALIPER ADJUSTMENT SHIM

BACKGROUND OF THE INVENTION

1. Field of the Invention

This invention relates to an apparatus and method for adjusting the camber of land vehicle wheel assemblies. In particular, it relates to a unique shim, and a method for installing the shim into the wheel assembly of a vehicle whereby wheel camber and the position of the brake caliper are adjusted together so that camber adjustment does not adversely affect the brake system.

2. Description of the Prior Art

The wheels of automobiles and other land vehicles must be properly aligned to reduce tire wear and to provide a true, free-rolling movement over the road. Wheel alignment is typically described in terms of camber, toe, caster, turning radius and steering-axis inclination. Caster, turning radius and steering-axis inclination are designed-in features, and are generally not subject to adjustment after a vehicle has been manufactured. Camber and toe, however, are subject to close tolerances that are difficult to achieve during manufacture and that require adjustments over the life of a vehicle.

Camber is a measurement in angular degrees of the inward or outward tilt of a wheel as measured from a vertical plane. Camber is usually considered "positive" when the top of the wheel leans outwardly towards the side of the vehicle, and is considered "negative" when the top of the wheel leans inwardly. In other words, two wheels that are at opposite ends of a common axle have positive camber when the tops of the two wheels are further apart from each other than the bottom of the wheels.

Incorrect adjustment of camber can lead to rapid and excessive tire wear, adverse handling of a vehicle, and rapid deterioration of the bearings supporting the misaligned wheel. Camber must be optimally set at the factory after assembly of a vehicle. Moreover, camber should be inspected and adjusted after operation of a vehicle over rough roads, involvement of the vehicle in an accident, and during routine maintenance checks.

U.S. Pat. No. 4,037,680, issued to one of the named inventors of this application, discloses an annular, tapered shim that is placed between the respective mounting pads of the spindle of a wheel and the axle to which the wheel spindle is attached. As disclosed in U.S. Pat. No. 4,037,680, different shims, each having different amounts of taper, can be placed between the wheel spindle and its supporting axle in this type of wheel assembly to selectively adjust the camber of the wheel. Locating the point of maximum thickness at the top of the installed shim yields a camber adjustment equal to the angle of taper. The shims include a plurality of apertures such that the bolts holding the wheel spindle to the axle can be received through the shim. A somewhat similar shim is shown in U.S. Pat. No. 4,195,862.

While prior art shims have had a variety of bolt hole configurations to allow them to accommodate different configurations and locations of fasteners connecting axles and wheels (see, e.g., U.S. Pat. No. 4,684,150), recent wheel suspension designs have led to new wheel assembly designs and have introduced a problem that cannot be accommodated by these known shims. In certain newer model cars, MacPherson strut suspensions are used. These suspensions have a housing at the lower end of the strut. On the housing is a mounting plate that is used for mounting both the disk brake caliper and also the hub and wheel bearing assembly associated with the wheel at that suspension assembly.

In this type of suspension, it is desirable to adjust camber by changing the angle between the mounting plate and the associated hub and wheel bearing assembly. A shim of conventional type might be used for this purpose. The difficulty with this is that adjustment using a shim at this location unavoidably affects the angle of the brake rotor (which is mounted on the hub and wheel bearing assembly). When the angle of the brake rotor is changed, it is no longer aligned with the brake caliper (which is mounted on the mounting plate). Although the angular misalignment and physical displacement may be relatively small, the brake system is still adversely affected. Accordingly, a shim that would permit camber adjustment in this type of suspension environment while preserving alignment between the brake rotor and brake caliper would be highly desirable.

SUMMARY OF THE INVENTION

The inventive shim is used in adjusting camber in a wheel mounted on a suspension assembly having a mounting plate with an opening for a drive axle for mounting both a brake caliper and a hub and wheel bearing assembly, both such caliper and hub/bearing assembly being associated with the wheel. The shim has a central shim body tapered to define a shim angle. The shim body has a drive axle opening therethrough and a plurality of openings for fasteners connecting the hub/bearing assembly to the mounting plate. At least one brake caliper lobe extends from the central shim body and provides an extension of the central shim body defining the same shim angle as the shim body. The lobe further has an opening therethrough for a fastener to connect the brake caliper to the mounting plate. The shim is interposed between the mounting plate, on the one hand, and the disk brake caliper and hub/bearing assembly, on the other hand, to adjust the angle of both by the defined shim angle.

It is an objective of the present invention to provide a camber adjustment shim for a MacPherson strut suspension in which both the brake caliper and the hub and wheel bearing assembly are mounted on the same mounting plate.

It is another objective of the present invention to provide a camber adjustment shim that adjusts the angular position of both the brake caliper and the hub and wheel bearing assembly in a MacPherson strut suspension.

It is a further objective of the present invention to provide a camber adjustment shim that adjusts wheel camber without disturbing the relationship of brake caliper and rotor.

These and other objects of the invention will become apparent in the following Description of the Preferred Embodiment, including the associated drawings.

DESCRIPTION OF THE DRAWINGS

FIG. 2 is a front elevational view of the invention;

FIG. 3 is a side elevational view thereof, and;

FIG. 4 is a fragmentary detail view of a typical shim installed in a wheel mounting assembly with the approximate section taken along line 4—4 of the shim in FIG. 2.

DESCRIPTION OF THE PREFERRED EMBODIMENT

Figure 1:
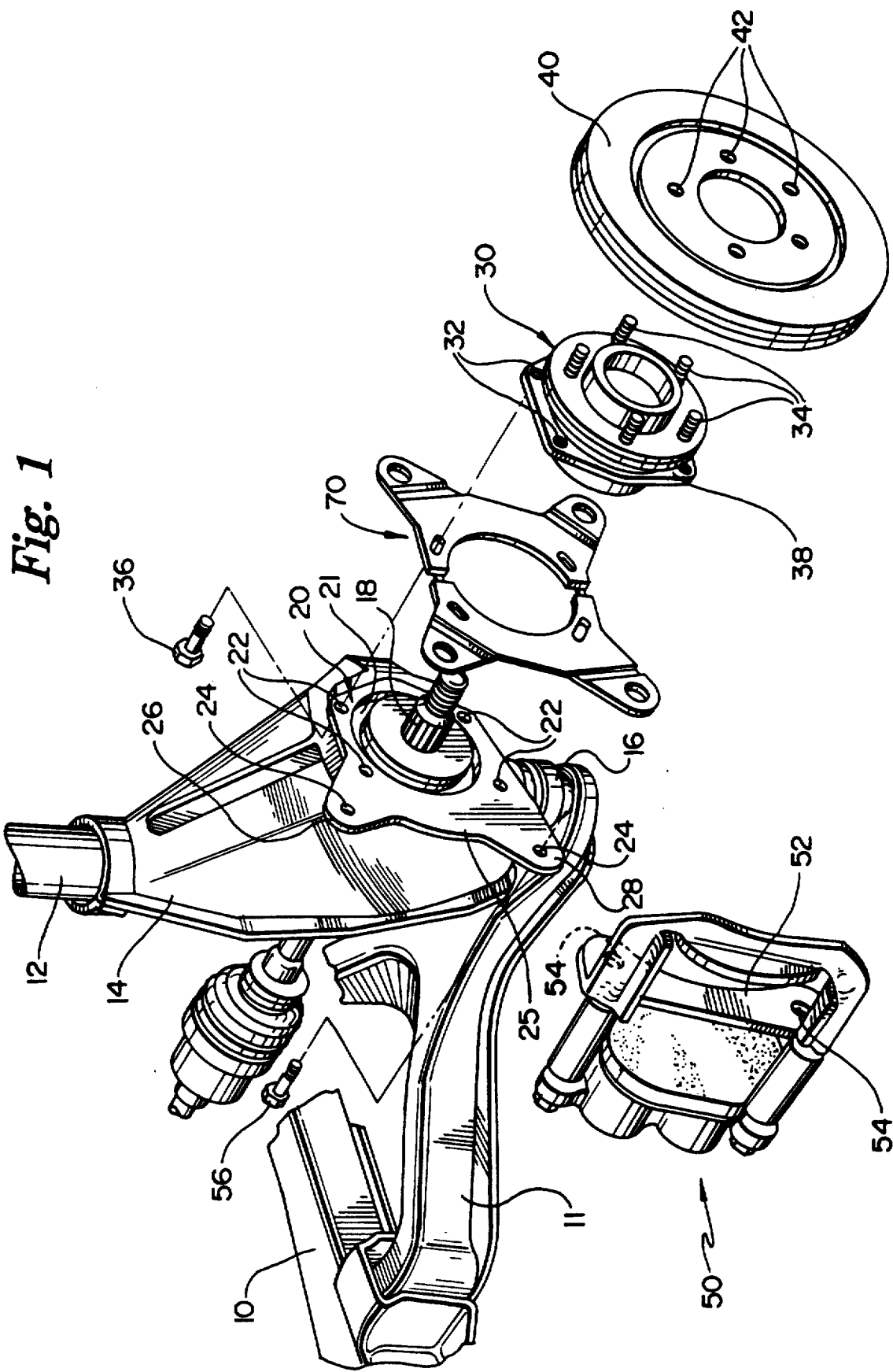
FIG. 1 is an exploded view of the present invention showing relative location of the inventive shim in a wheel mounting assembly.

In FIG. 1 is shown a portion of a MacPherson strut suspension for a wheel in a land vehicle. By way of example, the suspension is shown for the front, passenger side wheel of a vehicle for the American market. From the frame 10 of the vehicle, a wishbone arm 11 extends out to a ball joint 16. The ball joint 16 is at the lower end of a McPherson strut suspension assembly, which includes a strut 12 leading into a formed housing 14. The lower end of the housing 14 is connected to the arm 11 at the ball joint 16.

At the outboard side of the formed housing 14 is a mounting plate 20 having a drive axle opening 21 therethrough. A drive axle shaft 18 extends outwardly through the drive axle opening 21. At four locations distributed in a generally rectangular pattern around the drive axle opening 21 are fastener openings 22 through which pass hub and wheel bearing assembly retaining bolts 36 (only one of which is shown in FIG. 1). A portion of the mounting plate 20 extends away from the drive axle opening 21 to form a flange 25 with two lobes 26, 28. Each of the lobes 26, 28 has an opening 24 through which a caliper retaining bolt 56 (only one of which is shown in FIG. 1) will pass.

In the type of wheel assembly in which the present invention is used to adjust camber, a brake caliper 50 is attached directly to the flange 25 of mounting plate 20. The brake caliper assembly 50 has a caliper support flange 52 that is designed to have a complimentary fit with the lobes 26, 28 on the flange 25 of the mounting plate 20. Each caliper retaining bolt 56 passes through one of the openings 24 and is fastened in the threads of a hole 54 in the caliper flange 52. Also mounted on the mounting plate 20 is a hub and wheel bearing assembly 30 ("hub/bearing assembly") which carries the brake rotor 40. In a wheel assembly in which the present invention has not yet been introduced, the hub/bearing assembly flange 38 is attached directly to the mounting plate 20, with the drive axle shaft 18 passing through the center of the hub/bearing assembly 30. Hub/bearing assembly retaining bolts 36 pass through the openings 22 in the mounting plate 20 to be received in threaded holes 32 in the hub and wheel bearing assembly 30. The brake rotor 40 is, in turn, placed over the wheel lug bolts 34 of the hub/bearing assembly 30, by passing the wheel lug bolts 34 through corresponding holes 42 in the brake rotor 40.

The exploded view of FIG. 1 shows how a shim 70 in accordance with the present invention is inserted in the wheel assembly of FIG. 1 to adjust camber. Turning to FIGS. 2-4, the details of the shim 70 and of its insertion in the wheel assembly can be seen. As best seen in FIGS. 2 and 3, the shim 70 of the present invention is a relatively flat, planar object, except that it tapers from one edge to the other. The amount of taper and the orientation of the taper, i.e., whether the shim is thicker at the top or at the bottom, determines the amount and direction of camber adjustment affected. In the preferred embodiment of the invention, each shim defines a particular shim angle selected with due consideration for the geometry of the wheel assembly and the amount of camber adjustment desired. Typically, the range of camber adjustment desired is from ⅓ degree to about 1½ degrees, but this can vary from vehicle to vehicle. A shim as shown in FIG. 3, oriented with the thicker portion downward (as depicted in FIG. 3) would affect camber in a "negative" direction in a wheel assembly as shown in FIG. 1, by causing the top of the wheel where the shim is installed to tip inward.

As best seen in FIG. 2, the shim 70 of the present invention is constructed in two halves 70a, 70b. The two halves 70a, 70b are connected by thin connecting bridges 77, 77 at the top and the bottom of the shim 70. While the two shim halves 70a, 70b are not identical, they are very similar in construction and will be described together.

The left shim half 70a is constructed with a central shim body 72a. Correspondingly, the shim half 70b has a central shim body 72b. The two shim bodies 72a, 72b together form at their center a generally circular opening 71 to accommodate the drive axle shaft 18 when the shim 70 is installed in a wheel assembly. To accommodate the hub/bearing assembly retaining bolts 36, the shim half 70a has openings 74a, 75a; correspondingly, shim half 70b has bolt openings 74b and 75b. Extending outwardly from the upper and lower exterior corners of the shim body 72a are upper and lower lobes 90a and 91a, respectively. Each of the lobes 90a and 91a is connected to the central shim body 72a by a hinge web 92a, 93a, respectively. Each hinge web 92a, 93a is comprised of a thin section of the material from which a shim 70 is made. Preferably, this is material that flexes when formed in thin webs so that the lobes 90a, 91b can flex out of the plane of the shim body 72a to which they are attached. Each of the lobes 90a, 91a includes an upper and a lower caliper fastener opening 94a, 95a respectively. The right shim half 70b has a corresponding structure of openings, 74b, 75b, for hub/bearing assembly retaining bolts 36; lobes 90b, 91b, extending from central shim body 72b; hinge webs 92b, 93b connecting lobes 90b, 91b to the shim body 72b; and caliper fastener openings 94b, 95b.

To aid in proper orientation of the shim halves 72a, 72b in installation, each preferably bears certain indexing marks. First, indexing marks 80a, 80b and 82a, 82b are used at the top and bottom respectively of the shim halves 72a, 72b to indicate top and bottom orientation. Second, front to back indicator marks 84a, 84b indicate orientation in that sense. Finally, degree designation marks 88a, 88b are used to identify the amount of camber adjustment in angular degrees for which the shim 70 has been designed.

Referring again to FIG. 1, it can be seen that shim 70 is installed by placing it between the mounting plate 20, on the one hand, and the caliper flange 52 and the hub/bearing assembly flange 38, on the other hand. While the hub/bearing assembly 30 may be completely removed to permit direct insertion of the shim 70 without detaching shim halves 70a, 70b, it is preferable not to dismantle the entire wheel assembly. Accordingly, in the preferred procedure for installation, the shim 70 is separated into its two halves 72a, 72b by cutting or breaking it at the connecting bridges 77, 77. If a passenger side camber decrease were to be effected in the wheel assembly of FIG. 1, the following procedure would be used.

First, a camber reading is taken to determine the amount of camber change required and select the proper shim. The degree of camber correction needed leads to selection of a shim with a degree designation mark correspor. .'ng to the desired correction. Second, the vehicle should be elevated and the wheel (not shown), rotor 40 and brake caliper 50 removed. To remove the brake caliper 50, the bolts 56 are removed from threaded openings 54. The brake caliper 50 should then be supported while work continues, so that it does not hang on the brake line (not shown). Third, the front two hub/bearing assembly retaining bolts 36 must be removed (these are in the two bolt openings 22 nearer the caliper bolt openings 24) and the rear two hub/bearing assembly retaining bolts 36 must be loosened halfway (these are in the two bolt openings 22 farther from the caliper bolt openings 24). Next the front half 70a of the shim 70 would be inserted, with the openings 74a, 75a aligned with the two front openings 22 from which the hub/bearing assembly bolts 36 have been removed. These two bolts 36 are then reinserted (but not tightened) by passing them through the two front openings 22 and openings 74a, 75a, then screwing them partly into the threaded holes 32 of the hub flange 38. Next, the rear two hub/bearing assembly bolts 36 (previously loosened) are removed and the rear shim half 70b is inserted. As before, the openings 74b, 75b are aligned with the openings 22 from which the bolts 36 have been removed and the bolts 36 are reinserted and screwed into threaded holes 32 in hub flange 38. At this point the installer should check to insure that the openings 94a, 95a are aligned with the openings 24, 24 on the lobes 26, 28. Once these are aligned, all four bolts 36 can be tightened down in accordance with the manufacturer's torque specifications. Once this has been done, the brake caliper 50 can be reinstalled on the flange 25. The caliper retaining bolts 56 pass through the openings 24 in the lobes 26, 28 and also pass through the caliper fastener openings 94a, 95a in the lobes 90a and 91a. The caliper retaining bolts 56 are then tightened into threaded holes 54, using specified torque. In this installation, the lobes 90b, 91b remain unused and may be cut off, particularly if they might interfere with any other parts.

In the conventional MacPherson strut suspension, there is an offset between the plane of the flange 25 and the remainder of the mounting plate 20. As best seen in FIG. 4, this causes the lobes 90a, 91a to be offset slightly when the bolts 56 are inserted and tightened. As can further be seen from FIG. 4, the camber adjustment in the hub/bearing assembly 30 caused by the shim body halves 72a, 72b is extended to the brake caliper 50 by lobes 90a, 91a. Accordingly, the change in orientation of the rotor 40 that occurs because of the change in orientation of the hub/bearing assembly 30 is compensated for by a corresponding change in the orientation of brake caliper 50.

If a passenger side camber increase adjustment is desired, the procedure is the same as just described, except that the top and bottom of the shim 70 are reversed. That is, the shim 70 is inserted with the thinner edge of the shim 70 nearer the ground. Again, the front half of the shim 70 is installed first, with the front portion (two) of the bolts 36 removed. The rear half of the shim 70 is installed with the remaining, rear portion (two) of the bolts 36 removed.

For installations on the driver's side, the lobes 90b, 91b are used to adjust brake caliper position. Otherwise, installation is very much the same. As with the passenger side, adjusting camber in both the positive and negative directions is possible.

While the shim 70 could be made of various steels or other metal alloys of high compressive strength, in the preferred embodiment, hard, high compressive strength glass fiber reinforced nylon is used. It can be die-molded by conventional processes to the shape shown in FIGS. 2-3. Characteristics of high compressive strength and minimal resilience are desired, because the essential dimensions of a shim 70 should not change when the shim 70 is installed and the bolts 36 and 56 are tightened to manufacturers specifications.

It will be seen by those skilled in the art that certain variations of the structure of the present invention are possible. For example, it will be clear that if a larger number of hub and bearing assembly retaining bolts 36 were present, additional openings could be provided in the shim body halves 72a, 72b. Moreover, if the brake caliper 50 were fastened by more than two bolts 56 or by a single bolt in a different configuration, this could be easily accommodated by a corresponding change in the configuration of the lobes 90a, 91a extending outward from the shim body half 72a, 72b. Accordingly, the present invention is not intended to be limited by the description of the preferred embodiment, but rather only by the language of the appended claims.

What is claimed and desired to be protected by Letters Patent is:

1. A shim for use in adjusting camber in a wheel mounted on a suspension assembly having a mounting plate with an opening for a drive axle for mounting both a brake caliper and a hub and wheel bearing assembly, both such caliper and hub/bearing assembly being associated with said wheel, comprising:

a central shim body tapered to define a shim angle, said shim body having a drive axle opening therethrough and a plurality of openings for fasteners connecting said hub/bearing assembly to the mounting plate; and at least one brake caliper lobe extending from said central shim body, said at least one lobe providing an extension of the central shim body defining the same shim angle as the shim body, said at least one lobe further having an opening therethrough for a fastener for connecting the brake caliper to said mounting plate;

said shim being interposed between said mounting plate, on the one hand, and said disk brake caliper and hub/bearing assembly, on the other hand, to adjust the angle of both by the defined shim angle.

2. The shim as recited in claim 1 wherein the shim body is formed in two separable halves for placement on either side of the drive axle.

3. The shim as recited in claim 2 wherein each separable half has a pair of openings for fasteners connecting said hub/bearing assembly to the mounting plate.

4. The shim as recited in claim 3 wherein the shim is integrally formed with the two separable halves joined at a frangible connecting bridge.

5. The shim as recited in claim 1 wherein the at least one disk brake caliper lobe is connected to the shim body by a flexible joint that permits said lobe to be offset into a plane adjacent and substantially parallel to the plane of the shim body.

6. The shim as recited in claim 1 wherein the shim is formed integrally from a flexible material and the flexible joint is a thin web of said material connecting the shim body and the disk brake caliper lobe.

7. The shim as recited in claim 1 wherein the shim body is formed in two separable halves for placement on either side of said drive axle and at least one of said halves has a pair of disk brake caliper lobes extending from the central shim body.

8. A method for adjusting camber in a wheel assembly including a wheel mounted on a suspension assembly having a mounting plate with an opening for a drive axle, a brake caliper mounted on the mounting plate with a first plurality of fasteners and a hub and wheel bearing assembly mounted on the mounting plate with a second plurality of fasteners, said method comprising:

(a) demounting the brake caliper from the mounting plate by removing the first plurality of fasteners;

(b) removing that portion of the second plurality of fasteners mounting the hub/bearing assembly to the mounting plate located closest to that portion of the mounting plate where the brake caliper is mounted and inserting between said mounting plate and hub/bearing assembly a first shim element comprising:

a central shim body tapered to define a shim axle, said shim body having a plurality of openings for said second plurality of fasteners connecting said hub and bearing assembly to the mounting plate; and at least one brake caliper lobe extending from said central shim body, said at least one lobe providing an extension of the central shim body defining the same shim angle as the shim body, said at least one lobe further having an opening therethrough for a fastener connecting the brake caliper to said mounting plate;

(c) reinstalling those fasteners removed in step (b) by inserting them through the openings in the shim body of the first shim element;

(d) removing the remaining portion of the fasteners mounting the hub/bearing assembly to the mounting plate and inserting between said mounting plate and hub/bearing assembly a second shim element comprising a central shim body having a plurality of openings for fasteners connecting said hub and bearing assembly to said mounting plate, said first and second shim elements together defining a drive axle opening between them;

(e) reinstalling those fasteners removed in step (d) by inserting them through the openings in the shim body of the second shim element; and (f) remounting the brake caliper on the mounting plate by reinstalling the fasteners removed in step (a) and inserting them through the opening in said at least one brake caliper lobe.

* * * * *